United States Patent [19]

Gregory et al.

[11] Patent Number: 5,351,156
[45] Date of Patent: Sep. 27, 1994

[54] METHOD AND APPARATUS FOR CLEANING DISKS

[75] Inventors: Thomas A. Gregory; Christopher G. Keller, both of Rochester; James M. Severson, Byron, all of Minn.

[73] Assignee: International Business Machines Corporation, Armonk, N.Y.

[21] Appl. No.: 857,354

[22] Filed: Mar. 25, 1992

[51] Int. Cl.⁵ .............................................. G11B 15/18
[52] U.S. Cl. ................................... 360/74.1; 360/69; 360/128
[58] Field of Search ............... 360/103, 128, 137, 69, 360/71, 74.1

[56] References Cited

U.S. PATENT DOCUMENTS

| | | | |
|---|---|---|---|
| 3,366,390 | 1/1968 | Applequist et al. | 274/47 |
| 3,609,721 | 9/1971 | Meneley | 340/174 |
| 4,263,634 | 1/1981 | Chenoweth et al. | 360/133 |
| 4,384,311 | 5/1983 | McNeil | 360/128 |
| 4,490,766 | 12/1984 | Hill et al. | 360/137 |
| 4,510,541 | 4/1985 | Sasamoto | 360/128 |
| 4,594,617 | 6/1986 | Tezuka | 360/128 |

*Primary Examiner*—Louis J. Casaregola
*Attorney, Agent, or Firm*—Bradley A. Forrest; Richard E. Billion; Roy W. Truelson

[57] ABSTRACT

The back edge of a disk drive slider is used to remove debris from disk media by slowly sweeping it from the inner diameter of the disk to the outer diameter of the disk while the disk is rotating backwards from normal. The sweeping operation is completed while the disks are still gaining rotational speed so that liftoff velocity is not achieved. Material accumulated on the back edge of the slider is either dumped at the outer diameter of the disk, or remains on the back edge of the slider as normal operation is commenced.

40 Claims, 7 Drawing Sheets

METHOD AND APPARATUS FOR CLEANING DISKS

FIELD OF THE INVENTION

The present invention relates to disk drive devices, and in particular to a method and apparatus for cleaning disks with a slider.

BACKGROUND OF THE INVENTION

A disk drive, commonly referred to as a direct access storage device, has one or more disks for storing data in the form of discrete magnetic transitions. The disks are somewhat analogous to compact disks which are used in a CD player in that they are both round, and hold a large amount of digital data. In a disk drive, however, multiple disks are mounted to a spindle, and spaced apart so that they do not touch each other. Currently, disks range from 48 millimeters (1.8 inches) to 130 millimeters (5.25 inches) in diameter.

The surface of each disk is smooth and uniform in appearance. Data on the disks in a disk drive is not stored in grooves, but in tracks. Each disk surface has a number of data tracks situated in concentric circles. The tracks on the disk essentially replace the grooves in a 45 rpm record. Each track in a disk drive is further subdivided into a number of sectors which is just one portion of the circumferential track.

Disks in a disk drive are made of a variety of materials. The substrate has been made of glass, plastic or metal. In the case of magnetic recording, a magnetizable layer of metal is placed on the substrate. Data is stored on such a disk by magnetizing small portions of the magnetizable layer of the disk. The portions magnetized will be in one or more of the sectors mentioned above. The data is usually transformed or encoded into a more compact form before it is recorded on the disk. Each portion so magnetized can be thought of as representing either a one or zero.

In order to magnetize the surface of a disk, a small ceramic block, called a slider, containing an electromagnetic transducer, known as a read/write head is passed over the surface of the disk, following the tracks. More specifically, the read/write head is flown at a height of approximately 0.15 micrometers (six millionths of an inch) or less from the surface of the disk. During flight, over the disk surface, the read/write head is energized to various states, causing a domain within a sector in the track below it to be magnetized.

To retrieve data stored on a disk, the read/write head is flown over the disk again. This time, the small magnetized domains of the disk induce a current in the read/write head transducer. By detecting the current from the read/write head, and decoding multiple occurrences from many domains, the data is reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read/write head. Sometimes, a disk surface is dedicated to containing servo information. Servo information is made up of magnetized portions of the disk that contain information about the position of the head on the disk. Such servo information from one disk can help in determining where the heads on all the other disks are located. Further help may be provided by including some servo information in each sector on the disks.

The ceramic material comprising the slide, and the head which the slider supports are moved over the surface of the disk using an actuator arm. The actuator arms for multiple heads look like a comb, each tooth of the comb extending between the disks, and holding a head adjacent a disk surface by means of a suspension. A motor coupled to the comb that is referred to as an E block rotates the E block about its spine, causing the heads to move in a direction radial to the disks. The motor is controlled based on feedback from the servo information and with knowledge of where the desired data is physically located on the disk.

The slider is aerodynamically designed to fly close to the disk surface. Some sliders are subjected to a physical force or bias toward the disk surface by the suspension while others may be away from the disk surface. When the disk starts to rotate, the aerodynamic effect causes the slider to fly. Fluid next to the disk, be it air, or a lubricant, provides a cushion, which causes some sliders to be lifted up from the surface of the disk when the disk reaches a desired rotational velocity. In the case of a reverse biased slider, the pressure becomes less between the disk and the slider, causing the slider to move closer to the disk. In either case, the fly height of the slider is very small as previously stated.

The very close fly height can lead to problems when one considers the size of contamination inside the disk drive device. Most disk drives are sealed, and have filters which try to take particles away from the disk surfaces. Such disk drives are usually assembled in a clean room, to help ensure that particle contamination is minimized. In spite of such precautions, particles are still generated in the form of human skin flakes and plastic and steel particles having masses on the order of nanograms and picograms. Such is the magnitude of the contamination problems that are currently being faced. In spite of all the precautions, some particles may get caught in a lubricant that is used to keep the sliders from causing wear on the disks when the disk drive has been powered down. Such particles can easily smear on the disk surface, and sometimes actually destroy data stored on the disk or damage data heads. Collisions between heads and particles have become known as "head crashes" because of the damage that occurs. Dust particles can be disastrous. Other particles also can cause damage, even though they are much smaller than common dust.

U.S. Pat. No. 4,594,617 issued to Tezuka, describes problems related to dust or debris that accumulates on the head while the magnetic medium is rotating in a fixed direction. The solution was to use a cleaning medium, and rotate it at a slow rate, in the opposite direction. This is stated to work for cleaning the head, but does not address the problem of cleaning the disk itself. It also requires access to the disks, which is not practical in a sealed disk drive device.

In U.S. Pat. No. 4,263,634 to Chennoweth, a floppy diskette jacket which houses a data disk was provided with a wiping material. The material was set back from the opening in the housing so that fibers from the material did not interfere with the heads that were reading data from the disks in the opening. Again, the contamination problems faced here were related to dust sized particles. The disk surfaces were exposed to normal atmosphere. The size of the particles which cause problems in today's sealed disk drive devices are orders of magnitude smaller than those faced by Chennoweth.

In U.S. Pat. No. 3,609,721 issued to Meneley, dust particles were cleared from a disk surface by rotating the disk at normal operating speed while a read/write head having a slider with a round spherical bearing face was slowly swept across the surface of the disk. It was believed by the inventor that some particles struck the rounded side of the slider, and were dislodged. There was also described, a strong movement of air laterally outward from under the slider, which helps to carry dislodged particles, and other particles not so dislodged, clear of the slider. The slider was moved radially outward from the disk center by about one fourth the width of the slider per rotation of the disk.

Fibers contacting the disk surface were used in U.S. Pat. No. 3,366,390 issued to Applequist et al. to dislodge dust particles. Air flow from the rotating disks then carries the particles off of the disks.

All of the previous solutions were directed toward larger particles than presently are encountered. Such large particles were easily dislodged, and spun off the disk surface. The small particles which cause problems in today's disk drive devices do not dislodge so easily. The prior solutions have not proven effective in clearing disk surfaces of such debris.

SUMMARY OF THE INVENTION

Removal of debris from a disk surface of a disk drive device is accomplished by rotating the disk towards the back end of a slider. The slider is then moved incrementally radially outward and essentially removes debris from the disk.

The slider also serves to support a read/write head above the disk surface for reading and writing information on the disk surface. A front end of the slider is tapered in a direction away from the surface to provide an aerodynamic structure that is capable of generating lift. During normal operation, the disk is rotated into the front end of the slider, and the taper helps the slider to fly above the disk at a desired height. The back end of the slider rises fairly normal to the plane of the disk surface, which enables it to act like a debris plow. When the disk is moved toward the back end of the slider, debris is collected at the back surface.

During construction of the disk drive, which is usually done in a clean room environment, debris, measuring in the single digit microns (0.001 millimeters=1 micron) is generated, and can accumulate on the disk surface. When the disks are rotated into the front end of the slider, the debris slides under the taper, and then under the slider, where it can be smeared onto the disk's surface, or worse yet, the debris can scratch the slider or disk surface.

By rotating the disks in reverse, toward the back end of the slider, debris either stacks up on the back end of the slider, or is swept off the disk. During disk drive assembly, the slider is merged with the disk, and ends up being set down on the disk surface, referred to as being loaded, near the inner diameter tracks of the disk. When the disk has started to rotate toward the back of the slider, the slider is gradually moved toward the outside of the disk. When the entire disk surface has been swept, the disk rotation is stopped, and then started up again, this time with the disk rotating toward the front end of the slider. Debris which accumulated on the back end of the slider is then either dumped at the outer edge of the disk, or remains harmlessly on the back end of the slider.

In one preferred embodiment, the backwards sweeping operation is started as soon as power is supplied to the motor to start the disk rotating backwards from normal operation. The outwards sweep is completed prior to the disk reaching full rotational speed. While normal rotational velocities are greater than 5000 rotations per minute, the backwards sweep operation completes prior to the velocity reaching 1000 rotations per minute. This relatively low speed prevents the head from attaining lift off velocity during the sweep and ensures that minimal debris is trapped under the slider.

One advantage of the present invention is that the debris is first swept off the disk prior to running the disk in the normal direction, and possibly smearing or damaging the disk surface or head. By slowly sweeping outward, most of the debris accumulation occurs on the portion of the back of the slider closest to the outer edge of the disk. This helps keep the debris away from the head, which is usually more centrally located at the back of the slider.

By periodically performing the sweep, debris is kept from accumulating on the disk surface. Since little if any debris travels beneath the slider, the risk of any damage to the disk, slider or head is minimized. In one embodiment, the sweep is done every 500 start stop cycles, or after 1000 hours of continuous operation of the disk drive. In yet a further embodiment, the sweep is done when data error rates reach an undesirable threshold.

The disk sweeping operation is also useful with portable type disk drives which are designed to plug into computer systems, and be carried away, perhaps to a different computer system. Removable disk drives may be subject to more shock and vibration than most disk drives which were designed for use in a fairly stable computer system. The added shock and vibration can cause debris trapped inside the disk container to be redeposited on the disk surface. Such debris is easily removed by the sweeping operation. Disk drives are also finding their way into applications outside the normal desk top computer configuration, such as laptop computers. As they move into copiers and automobiles, they too will be subject to more vibration and shock, and thus may avail themselves of the present disk sweeping invention.

BRIEF DESCRIPTION OF THE DRAWINGS

For a better understanding of the present invention, reference can be made to the accompanying drawings, in which.

DETAILED DESCRIPTION OF THE PREFERRED EMBODIMENT

Figure 1:
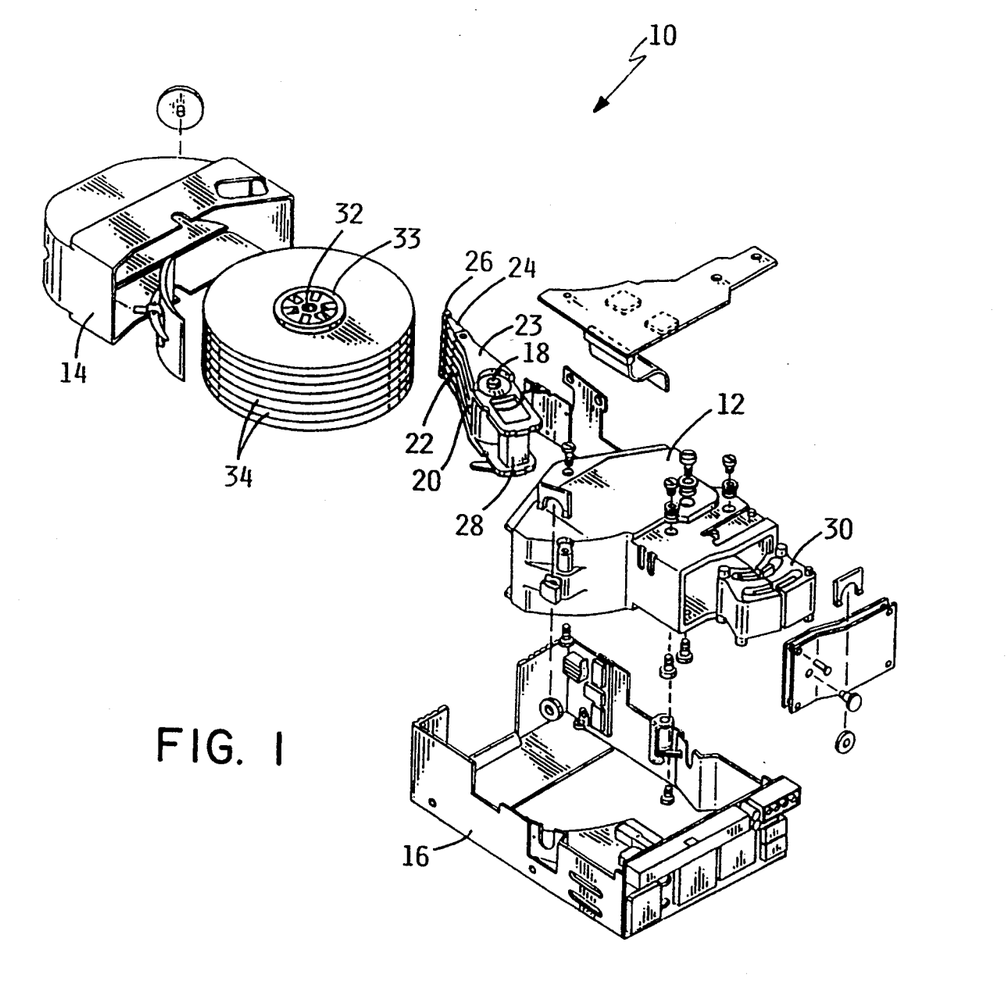
FIG. 1 is an exploded view of a disk drive device.

FIG. 1 is an exploded view of a disk drive, indicated generally at 10. Disk drive 10 includes a housing 12, and a housing cover 14 which, after assembly is mounted within a frame 16. The housing 12 and housing cover 14 form a disk drive enclosure. Rotatably attached within the housing 12 on an actuator shaft 18 is an actuator arm assembly 20. The actuator arm assembly 20 includes an E block 22, which is a comb like structure having a plurality of arms 23. Attached to the separate arms 23 on the E block 22, are load springs 24, commonly referred to as suspensions. Attached at the end of each load spring is a slider 26 which carries read/write elements (not shown in FIG. 1). On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 28. Also mounted within the housing 12 is a spindle shaft. A hub assembly 33 is rotatably attached to the spindle shaft 32. The spindle assembly includes the spindle shaft 32 and the hub assembly 33. In FIG. 1, eight disks 34 are attached to the hub assembly 33. As shown in FIG. 1, disks 34 are attached to the hub assembly 33 with substantially equal spacing between each disk.

Figure 2:
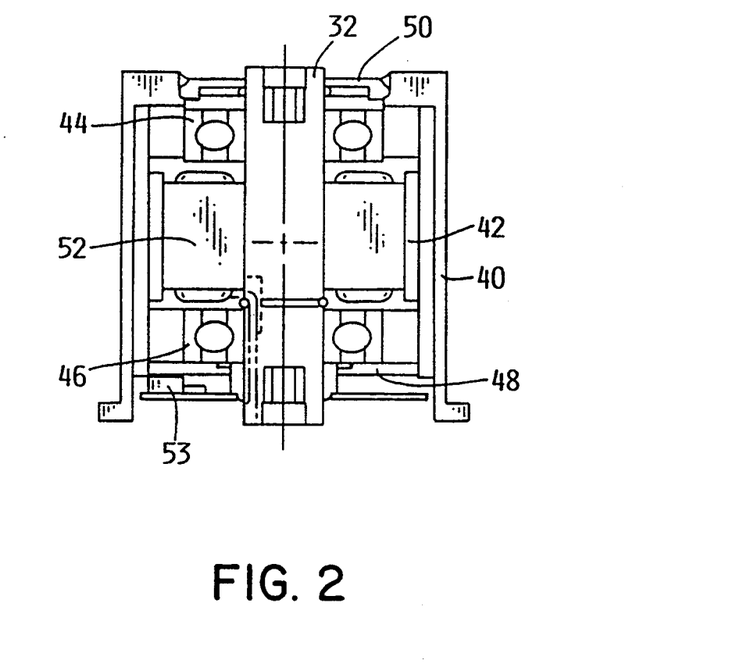
FIG. 2 is a detailed view of a spindle and spindle motor assembly for the disk drive of FIG. 1.

In FIG. 2, the spindle shaft 32 and hub assembly 33 is shown. The hub assembly 33 includes a hub 40, hub magnets 42, a first bearing set 44, a second bearing set 46, a mechanical seal 48 and a magnetic fluid seal 50. Attached to the spindle shaft 32 is a stator 52 which is a set of coils through which electrical current passes. In operation, the stator 52 on the spindle shaft 32 and the hub magnets 42 attached to the inside of the hub 40 form an in-hub electrical motor which is used to rotate the hub 40 and the disks 34 which are attached to the hub. Electrical energy is input to the stator so that the polarity of the stator is constantly changing and rotating. The hub magnets 42 on the hub 40 follow the changing polarity. In a disk drive, the in-hub motor rotates in excess of 3500 revolutions per minute.

In most disk drive devices, the coils in stator 52 are arranged in pairs, each pair corresponding to a hub magnet. When starting the in-hub motor, electrical energy is applied to each pair of stator coils in a well known manner. The application of energy is alternated between the two magnets of each pair so that the hub magnets 42 are all attracted in the same direction. Initially, half the time the direction is backwards from the normal read/write direction. This is usually detected, as by use of a Hall sensor indicated at 53. If the direction is opposite that intended, the energy is redirected to the other coil in the pairs of coils to reverse the direction of rotation. Several well known direction detection techniques are used in various disk drives, including the sensing of the spindle motor current referred to as back emf detection as well as the use of the Hall sensor. The direction of rotation is usually detected very quickly, within a few pulses of electrical energy to the coils.

Figure 3:
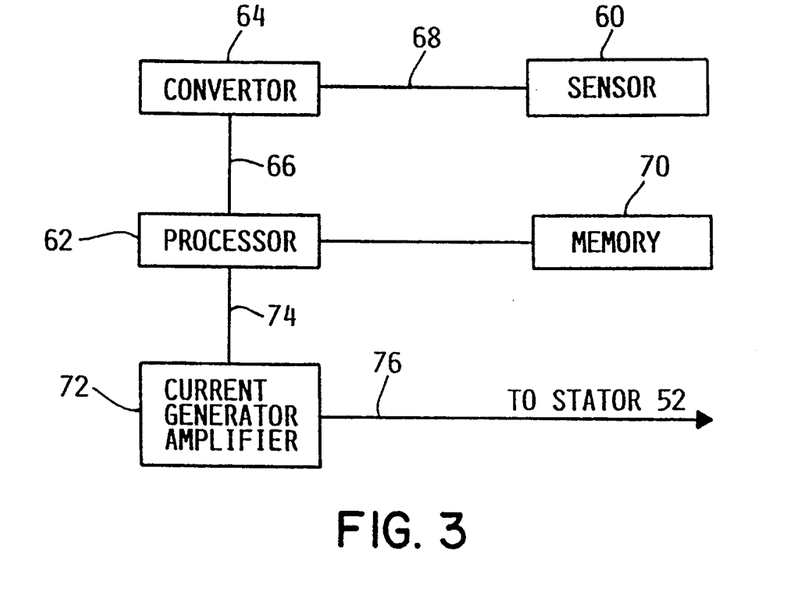
FIG. 3 is a block diagram of a spindle motor controller.

A block diagram of the circuit is shown in FIG. 3. A sensor 60, which corresponds to sensor 53 in FIG. 2, detects the direction of rotation of the disks. Sensor 60 provides a signal representative of the direction of the rotation of the disks to a processor 62 via a signal converter 64 by lines 66 and 68 respectively. Lines 66 and 68, as well as other lines depicted in other electrical diagrams in this specification comprise the appropriate type of communication medium, such as a parallel or serial electrically conductive wire, or wires, or optically conductive lines. Converter 64 operates to change the signal from sensor 60 to one understood by processor 62, such as a digital representation of the direction of rotation. In some embodiments, it also provides velocity of rotation information.

Processor 62 may be any standard type of microprocessor such as one from the Motorolla 68000 family. It is coupled to a memory 70 which stores programs for control of the current supplied to stator 52. Other programs include those which control the positioning of sliders and the actual reading and writing of data on the disk surfaces. Processor 62 controls a current generator/amplifier 72 via line 74. Amplifier 72 provides current to the stator magnets 52 via line 76. Line 76 comprises electrically conductive lines sufficient to permit synchronized energization of the stator magnets 52.

In operation, processor 62 directs amplifier 72 to provide current pulses to stator magnets 52 to cause the disks to rotate in a desired direction. Sensor 60 provides immediate feedback to processor 62, which, if the disks are rotating opposite the desired direction, causes the amplifier 72 to provide electrical energy to the other magnet in each pair of stator magnets 52. This causes the disks to rotate in the other direction. Processor 62 is also used to control the velocity of disk rotation by altering the frequency of energization of the stator magnet pairs 52.

Figure 4:
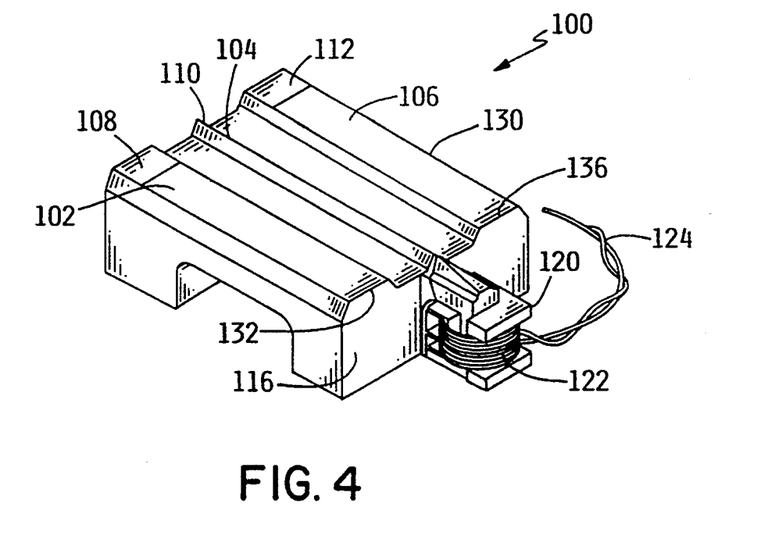
FIG. 4 is a perspective view of a disk slider.
Figure 5:
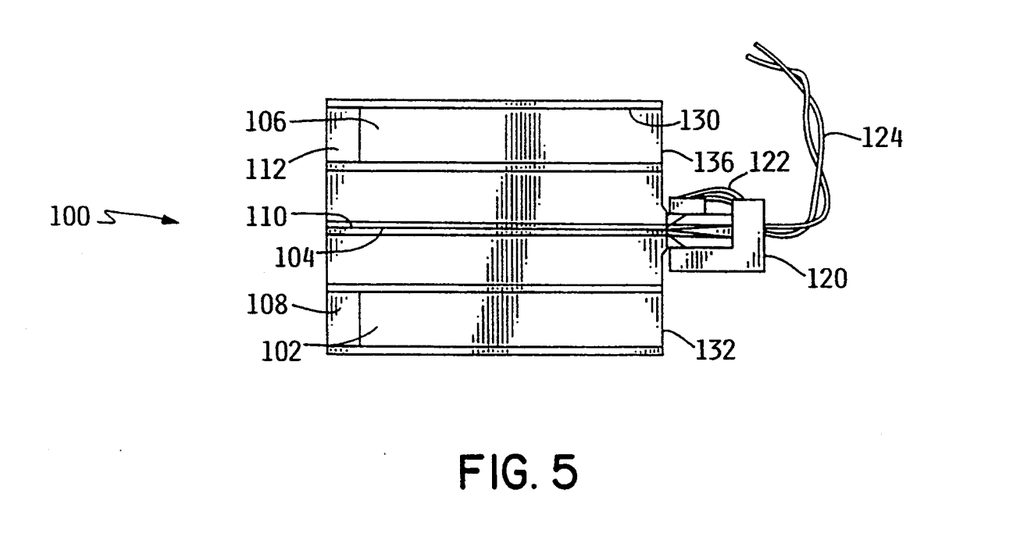
FIG. 5 is a bottom view of the disk slider of FIG. 4.
Figure 6:
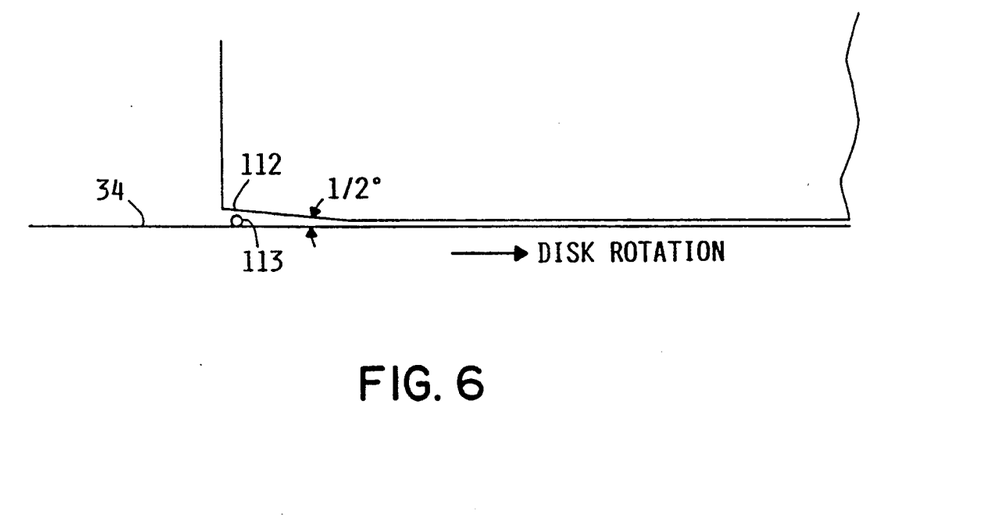
FIG. 6 is a block diagram side view of the front end of a disk slider.

A slider indicated generally at 100 is shown in more detail in FIG. 4 and FIG. 5. Slider 100 has three rails, 102, 104 and 106 the flat surfaces of which that confront the disk surface are referred to as air bearing surfaces. Each rail has a surface 108, 110 and 112 which is toward the front of slider 100, and is ramped away from the disk surface. The ramps help the slider lift off the disk surface and fly and at a desired height when the relative velocity between the slider 100 and disk surface reaches a certain level. The details of such ramps, and aerodynamic characteristics are well known in the art. A more detailed representation of the ramp 112 is shown in FIG. 6 in relation to a disk surface 34. A not to scale particle of debris is shown at 113 The angle between ramp 112 and disk 34 is about 0.0087 radians ($\frac{1}{2}$ degree) in this embodiment. At the back end 116 of the slider 100, a ferrite head 120 extends beyond the back end 116 of slider 100. The head 120 is wound with wire 122 to form an electromagnetic transducer. The wires are connected by leads 124 to common read/write circuitry.

The slider itself is commonly formed of a ceramic material. Ferrite, calcium titante and alumina/titanium carbide are common materials used. Some sliders will be overcoated with carbon, or hydrogenated carbon. The head 120 may also be made of similar materials, and may be of the inductive, or magnetoresistive types. Other types of heads, and materials for sliders and heads will work well with the present invention.

Figure 7:
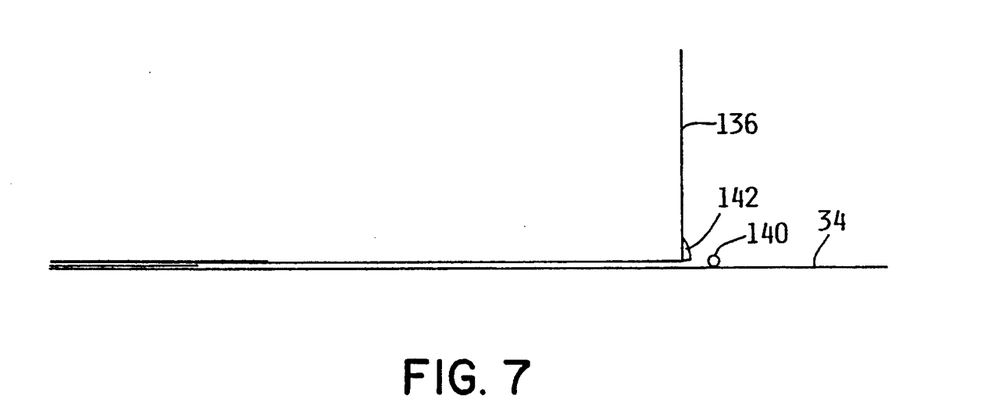
FIG. 7 is a block diagram side view of the back end of a disk slider.

Several plowing edges are formed by the back end 116 and an outer diameter edge 130 of slider 100. The outer diameter edge 130 is the edge of the slider which is closest to the outer diameter of the disk where it meets the surface of rail 106. The back end plowing edges are specifically located at 132 and 136 respectively next to the disk surface where the back end surface meets rails 102 and 106. Debris is accumulated by these edges when the disk is rotated backwards as represented in FIG. 7. The representations of debris on the disk 140 and debris accumulating on the back end of slider 136 indicated at 142 are not to scale. It can be seen that the outer edge 130 of slider 100 contains a chamfer, which makes the plowing edge not quite as steep as the back edges 132 and 136. However, it is steep enough to prevent debris from being swept under the rail 106. The chamfered surface forms an angle of about 1.05 radians (60 degrees) between it and the disk surface.

The edges themselves are formed by lapping the slider 200 to leave a very sharp edge. The radius of curvature of such edges in one preferred embodiment is about 3000 Angstroms. In further preferred embodiments, conventional polishing techniques are used to obtain curvatures on the order of 150 to 300 Angstroms. A sharp edge is preferable to prevent debris from sliding under the slider.

In one preferred embodiment, only outer diameter edge 130 and back edge 136 are sharpened. This reduces the chance that the disk surface may damaged by a sharp edge when the slider comes into contact with the disk surface. The slider 100 can also be mounted on suspensions 24 so that other edges are more likely to come into contact with the disk first.

Figure 8:
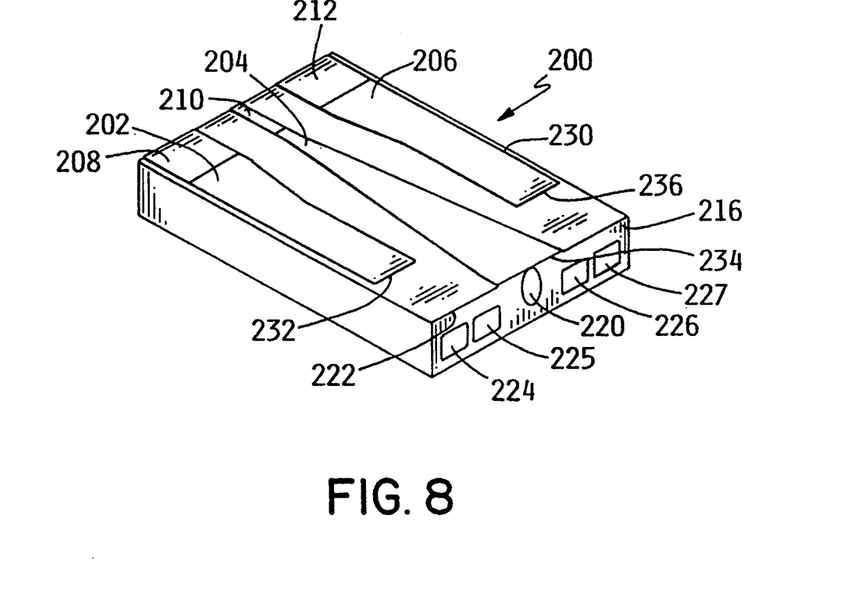
FIG. 8 is a perspective view of a disk slider.
Figure 9:
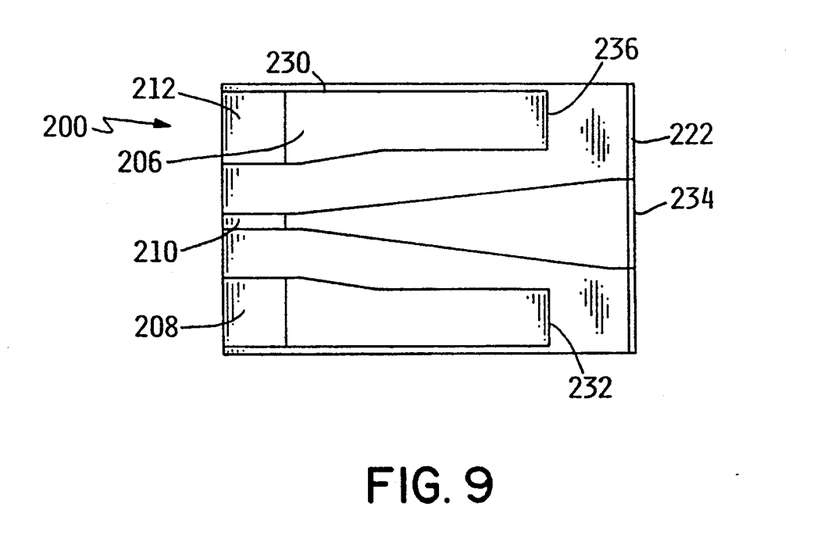
FIG. 9 is a bottom view of the disk slider of FIG. 8.

A second slider indicated generally at 200 is shown in FIGS. 8 and 9. Slider 200 also has three rails, 202, 204 and 206 which are adjacent the disk surface. Each rail has a surface 208, 210 and 212 which is toward the front of slider 200, and is ramped away from the disk surface. The ramps help the slider lift off the disk surface and fly and at a desired height when the relative velocity between the slider 200 and disk surface reaches a certain level. The details of such ramps, and aerodynamic characteristics are well known in the art. At the back end 216 of the slider 200, a magnetoresistive head 220 is embedded in an alumina layer 222. The alumina 222 is about a 50 micron layer extending beyond the back end 216 of slider 200. The head 220 is comprised of one or more deposited thin film resistive paths which form an electromagnetic transducer. Several bonding pads 224, 225, 226, and 227 are available for connection to common read/write circuitry.

Several plowing edges are formed by the alumina layer 222 and an outer diameter edge 230 of slider 200. The outer diameter edge 230 is the edge of the slider which is closest to the outer diameter of the disk where it meets the surface of rail 206. The back end plowing edges are specifically located at 232, 234 and 236 respectively next to the disk surface where the substrate meets rails 202, 204 and 206. Debris is accumulated by these edges when the disk is rotated backwards.

Figure 10:
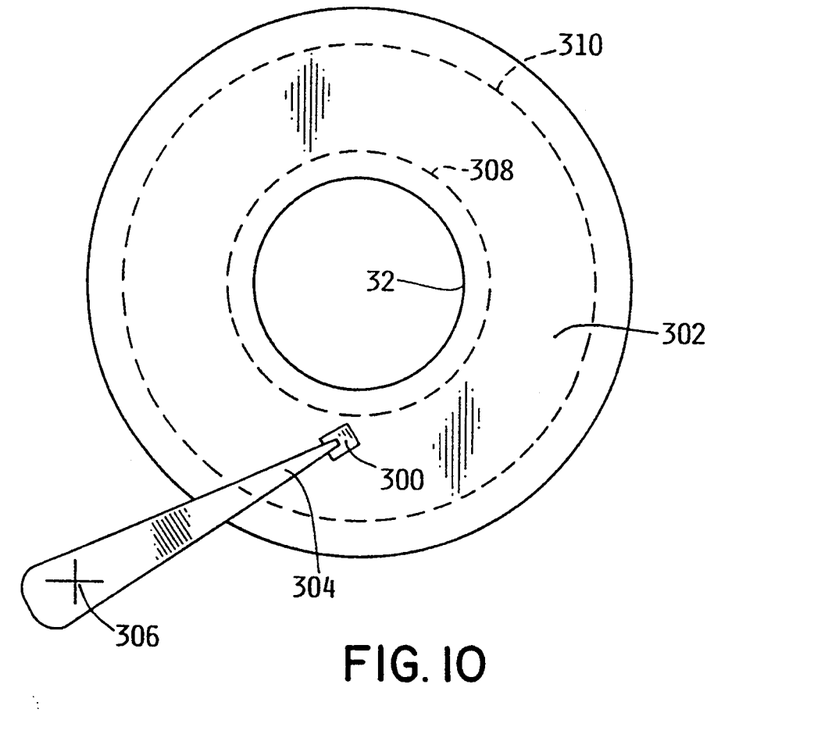
FIG. 10 is a top view of a disk and actuator.

In FIG. 10, a top view is provided with respect to the orientation of a slider 300 and a disk surface 302. The slider 300 is attached to a suspension 304, which is rotated about an actuator shaft 306. The disk has a series of concentric tracks onto which the magnetic information is recorded. The inner diameter 308 is the innermost concentric track on which data may be stored. There is a physical crash stop which physically prevents the actuator from moving slider 300 further in on the disk 34 than inner diameter 308. The outer diameter 310 is the outermost concentric track on which data may be stored. The slider 300 movement across the tracks is rotational about the actuator shaft 306.

The disk as viewed in FIG. 10 is rotated counter clockwise in normal data reading and writing operation. In the backwards sweep operation, the actuator is biased against the inner diameter crash stop so that the slider 300 is located on the inner diameter 308. The outside plowing edge of the slider 300 does not line up with the inner diameter, but is at a slightly tangential angle to the inner diameter 308. When the disk is started backwards to initiate the sweep operation, the slider is preferably moved outward about of 0.1 millimeter, which is about one-fourth of the width of rail 106 in FIG. 4, after each rotation of the disk. The precise distance to move the head outward with each rotation of the disk will vary depending on the different rail widths of different sliders. It is moved about one-half the width of the plowing edge in some embodiments to ensure the disk surface is swept as clear as possible. The distance will usually be between 0.1 and 0.9 of the width of the rail, although it will depend on the angle of the slider, and the particular plowing characteristics, and may even be greater than the width of the rail. The slider in FIG. 8 is narrower than that in FIG. 4, so it is only moved 0.05 millimeters per revolution of the disk. In one preferred embodiment, the move is made at the end of each rotation. In others, smaller moves are made during each rotation that add up to the desired movement per rotation. For each different disk drive, routine experimentation is required to optimize the sweep. In one embodiments, the motor is powered up open loop wile the slider is moved. If spindle motor speed control is desired, it is easily programmed for processor 62 and stored in memory 70.

As the slider in FIG. 10 moves closer to the outer diameter 310, the angle of the outside plowing edge to the tracks decreases so that by the time the outside diameter track is reached, the back of the slider is substantially perpendicular to the tracks. The slider is moved past the outside data track, and then the disk is stopped. Preferably, the disk rotation did not exceed 1000 revolutions per minute. At that speed, liftoff velocity for the slider has not been achieved, and the debris accumulating on the plowing edges does not get the opportunity to slide under the slider and smear the disk surface. Once the disk rotation is stopped and then started in the normal direction, most of the debris is either dumped on the outer tracks, or remains on the back plowing edges of the slider.

The term "plowing" as used herein, usually refers to a surface which accumulates debris, as opposed to merely shoving debris off to the side, such as a snow plow. While the latter mode of operation may be suitable, debris is accumulated by the plow in the preferred embodiment so that it is only removed from the surface once versus continually dumping and removing debris as the slider is moved radially outward.

Figure 11:
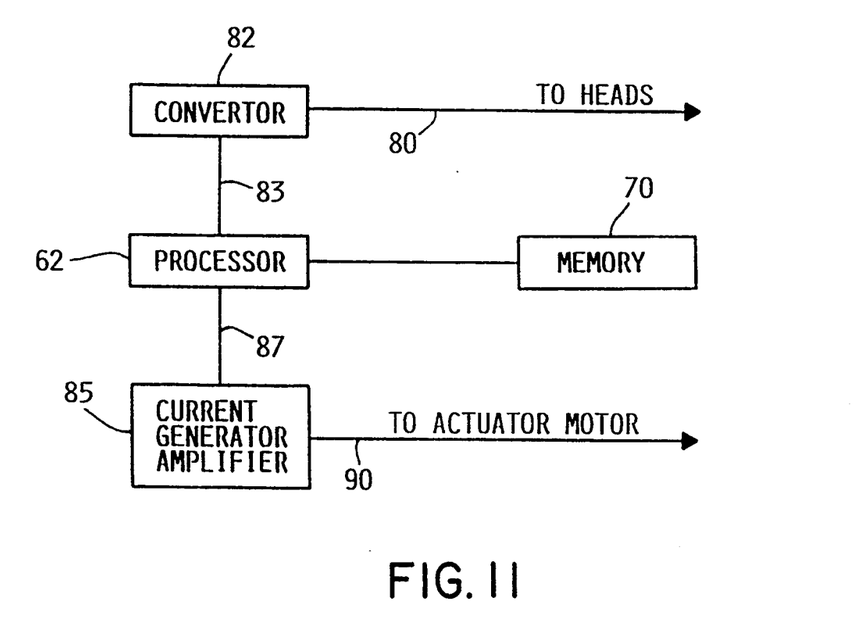
FIG. 11 is a block diagram of an actuator motor controller.

A block diagram of an actuator control circuit is shown in FIG. 11, which is numbered consistently with FIG. 3. An electrically conductive line 80 is coupled to at least one servo head, which reads positional information written on at least one of the disks 34. A converter 82 provides the positional information via a line 83 to processor 62. Processor 62, as controlled by programs stored in memory 70, directs a current generator/amplifier 85 via line 87 to provide electrical energy to the actuator coils 30 via line 90 to move the slider as desired. As previously discussed, the lines are representative of means to communicate with and/or energize components.

As can be seen from the preceding description, there are opportunities to increase the speed at which the sweep operation is performed. Since the outer diameter sweep edge presents a larger sweep profile at the inner diameter due to the angle of the slider with respect to the tracks, in a further embodiments, larger increments of radially outward movement of the slider are used closer to the inner diameter track. This results in fewer disk rotation required to sweep the track clear. One could also modify the rail shapes at the back of the slider to present larger sweep areas. This would have to be done with consideration of the aerodynamic effects on normal read/write operation. A further improvement involves determining how many more rotations are required to complete the sweep, and then cutting power to the disk rotating motor so that the disks stop rotating immediately after the sweep operation has occurred. This eliminates extra time required to stop the disk backward rotation prior to starting its forward rotation.

In one preferred embodiment, the frequency of disk cleaning is controlled by processor 62. Processor 62 monitors the error rate in reading data from the disks. When a data error rate threshold is passed, the sweep operation is initiated by processor 62. If a high error rate continues, the sweep operation is at least temporarily discontinued, and processor 62 generates an error message or alert.

In a further embodiment, the number of start-stop cycles of the disk drive is monitored by processor 62. At a predetermined number such as 500 or 1000 of such cycles, the sweep operation is initiated by processor 62. The number of such cycles will vary from drive to drive, and is easily determined by experiment. The effect on performance is also a factor which is considered. In one embodiment, if the desired number of cycles is approaching, the sweep is initiated by processor 62 during a period of relative inactivity of the drive so as not to impact performance.

In yet a further embodiment, processor 62 monitors the number of hours of continuous operation of the disk drive. Following 1000 hours of such operation, processor 62 initiates the sweep operation.

Figure 12:
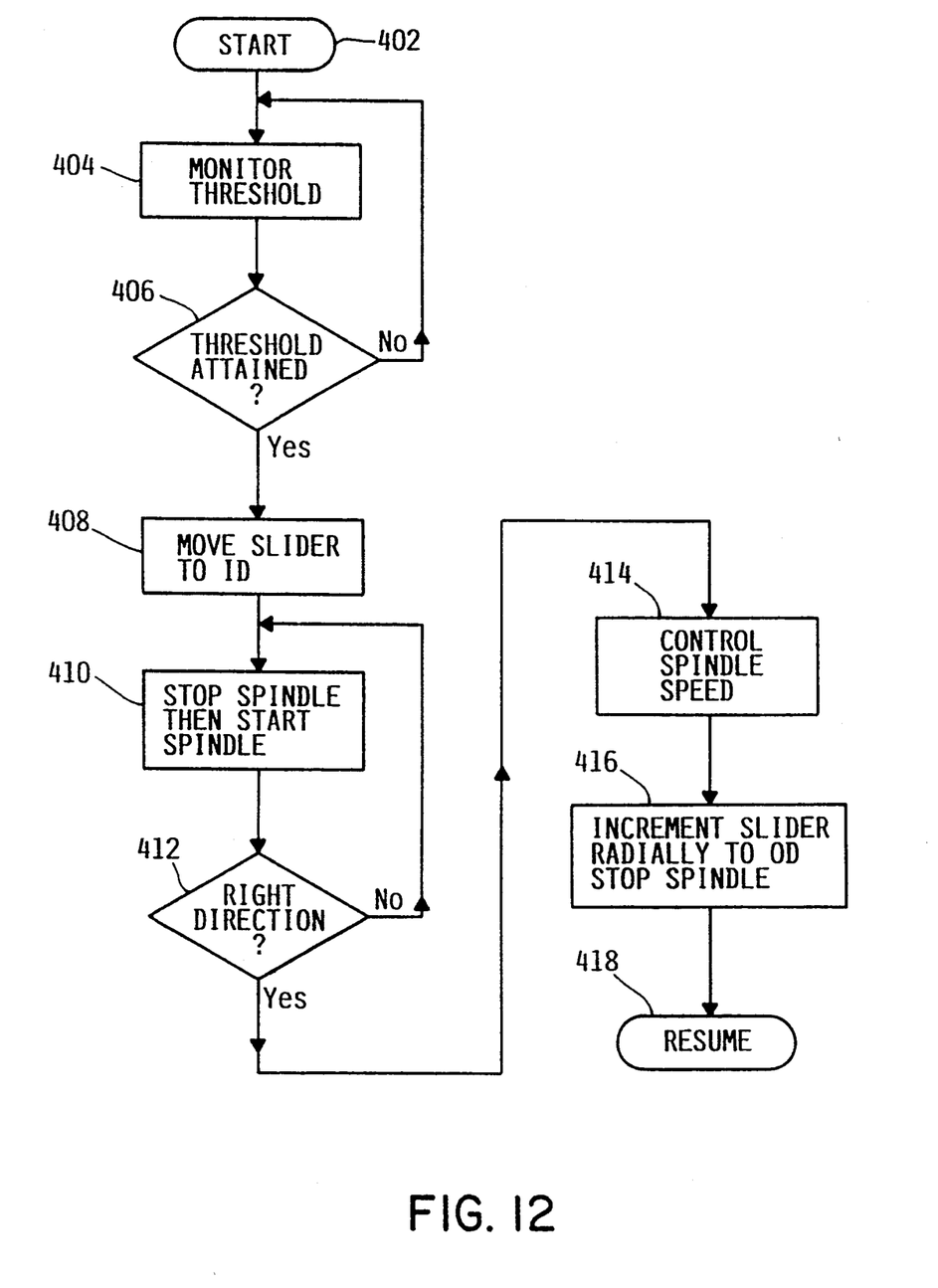
FIG. 12 is a flow chart of the disk cleaning process.

A flowchart of the disk cleaning process is shown in FIG. 12. The process starts at block 402.

At block 404, at least one of the thresholds described above is monitored by processor 62. In actual implementation, threshold monitoring can be part of the normal startup program, and included in processes dealing with error monitoring, start-stop monitoring or hours of operation tracking.

At decision block 406, if the threshold is not attained, block 404 continues monitoring. If the threshold is attained, the slider is moved to the inner diameter, ID, at block 408, and the spindle is stopped, then started at block 410.

Decision block 412 ensures that the spindle has started in the backwards direction. If not, block 410 is entered again.

Spindle speed is controlled at block 414 to keep it below slider takeoff speed. In the preferred embodiment, the spindle is accelerated at the same speed as during normal startup.

Block 416 then increments the slider position radially outward to the outer diameter, OD. Normal operation of the disk drive is resumed at block 418.

If highly polished disk surfaces are used, the sliders may undergo stick-slip phenomenon during start up or at reduced spindle speed. To prevent possible resonant excitation of the slider-suspension system by such perturbations, it may be desirable to damp the load springs 24 by application of a polymeric coating and/or to add polymeric damping elements known in the art; an improvement can also be obtained by modification of the load spring mechanism shown in The present invention and the best modes of practicing it have been described. It is to be understood that the foregoing description is illustrative only and that other means and techniques can be employed without departing from the full scope of the invention as described in the appended claims.

What is claimed is:

1. A data storage device comprising:
   a disk having a data storing surface;
   means for controllably rotating said disk in first and second directions;
   a slider supported adjacent the data storing surface of said disk, said slider transducing data when said disk is rotated in the first direction; and
   means for moving the slider to remove debris from the data storing surface when said disk is rotated in the second direction.

2. The data storage device of claim 1 wherein said slider supports a head for reading and writing data.

3. The data storage device of claim 2 wherein said head comprises a magnetoresistive transducer.

4. The data storage device of claim 2 wherein said head comprises a thin film magnetoresistive transducer.

5. The data storage device of claim 2 wherein said head comprises an inductive transducer.

6. The data storage device of claim 2 wherein said head comprises a thin film inductive transducer.

7. The data storage device of claim 1 wherein said slider is comprised of a ceramic material.

8. The data storage device of claim 1 wherein said slider is comprised of ferrite.

9. The data storage device of claim 1 wherein said slider is overcoated with carbon.

10. The data storage device of claim 1 wherein said slider supports a ferrite transducer head for reading and writing data.

11. The data storage device of claim 1 wherein said slider has an outer diameter rail and a back end surface, said slider further comprising a plowing edge formed by the intersection of the surface of said outer diameter rail adjacent the disk surface, and the back end surface of the slider.

12. The data storage device of claim 11 wherein said slider further comprises an outer diameter edge and a second plowing edge formed by the intersection of the outer diameter edge of the slider and the surface of the outer diameter rail adjacent the disk surface.

13. The data storage device of claim 12 wherein the angle of intersection of the outer diameter edge of the slider and the surface of the outer diameter rail is sufficiently great and sharp to inhibit debris on the disk surface from sliding under the rail surface.

14. The data storage device of claim 1 wherein said slider has at least one rail, and a plowing edge formed by the intersection of the surface of at least one rail adjacent the disk surface and at least one side of the slider.

15. The data storage device of claim 14 wherein the angle of intersection of the outer diameter edge of the slider and the surface of said rail is sufficiently great and sharp to inhibit debris on the disk surface from sliding under the rail surface.

16. The data storage device of claim 1 and further comprising:
means for monitoring the error rates of the disk drive; and
means for initiating the cleaning of the disk based on said error rates.

17. The data storage device of claim 1 and further comprising:
means for monitoring the number of start-stop cycles of the disk drive; and
means for initiating the cleaning of the disk based on said count.

18. The data storage device of claim 1 and further comprising:
means for monitoring the error rates of the disk drive;
means for initiating the cleaning of the disk based on said error rates;
means for monitoring the number of start-stop cycles of the disk drive; and
means for initiating the cleaning of the disk based on said count.

19. A data storage device comprising:
a disk having a data storing surface;
means for controllably rotating said disk in first and second directions;
a slider supported adjacent the data storing surface of said disk, said slider having a surface forming a plowing edge; and
means for moving the slider to plow debris from the data storing surface when said disk is rotated in the second direction.

20. A data storage device comprising:
a disk having a data storing surface;
means for controllably rotating said disk in first and second directions;
a slider supported adjacent the data storing surface of said disk, said slider having a surface forming a plowing edge;
means for moving the slider to plow debris from the data storing surface when said disk is rotated in the second direction;
a frame for supporting the disk rotating means and actuator means; and
a cover sealingly coupled to the frame for preventing harmful particle contamination from entering the data storage device.

21. The data storage device of claim 20 wherein said slider supports a head for reading and writing data.

22. The data storage device of claim 21 wherein said head comprises a magnetoresistive transducer.

23. The data storage device of claim 21 wherein said head comprises a thin film magnetoresistive transducer.

24. The data storage device of claim 21 wherein said head comprises an inductive transducer.

25. The data storage device of claim 21 wherein said head comprises a thin film inductive transducer.

26. The data storage device of claim 20 wherein said slider is comprised of a ceramic material.

27. The data storage device of claim 20 wherein said slider is comprised of ferrite.

28. The data storage device of claim 20 wherein said slider is overcoated with carbon.

29. The data storage device of claim 20 wherein said slider has an outer diameter rail, and said plowing edge is formed by the intersection of the surface of the rail adjacent the disk surface, and the back end of the slider.

30. The data storage device of claim 29 wherein a second plowing edge is formed by the intersection of the outer diameter edge of the slider and the surface of the outer diameter rail.

31. The data storage device of claim 30 wherein the angle of intersection of the outer diameter edge of the slider and the surface of the outer diameter rail is sufficiently great enough to inhibit debris on the disk surface from sliding under the rail surface.

32. The data storage device of claim 20 wherein the slider includes an outer diameter rail and an outer diameter edge, said plowing edge formed at the intersection of the outer diameter edge and the surface of the outer diameter rail, the angle of intersection between the outer diameter edge of the slider and the surface of the outer diameter rail being sufficiently great and sharp to inhibit debris on the disk surface from sliding under the rail surface.

33. The data storage device of claim 30 wherein the angle of intersection of the outer diameter edge of the slider and the surface of the outer diameter rail is sufficiently great and sharp to inhibit debris on the disk surface from sliding under the rail surface.

34. The data storage device of claim 20 and further comprising:
means for monitoring the error rates of the disk drive; and
means for initiating the cleaning of the disk based on said error rates.

35. The data storage device of claim 20 and further comprising:
means for monitoring the number of start-stop cycles of the disk drive; and
means for initiating the cleaning of the disk based on said count.

36. The data storage device of claim 20 and further comprising:
means for monitoring the error rates of the disk drive;
means for initiating the cleaning of the disk based on said error rates;
means for monitoring the number of start-stop cycles of the disk drive; and
means for initiating the cleaning of the disk based on said count.

37. A data storage device comprising:
a disk having a data storing surface;
means for controllably rotating said disk in first and second directions; and
a slider supported adjacent the data storing surface of said disk, said slider transducing data when said disk is rotated in the first direction, and removing debris from the data storing surface when said disk is rotated in the second direction.

38. The data storage device of claim 37 and further comprising:
means for monitoring the error rates of the disk drive; and
means for initiating the cleaning of the disk based on said error rates.

39. The data storage device of claim 37 and further comprising:
means for monitoring the error rates of the disk drive;
means for initiating the cleaning of the disk based on said error rates;
means for monitoring the number of start-stop cycles of the disk drive; and
means for initiating the cleaning of the disk based on the count.

40. A data storage device comprising:
a disk having a data storing surface;
means for controllably rotating said disk in first and second directions;
a slider supported adjacent the data storing surface of said disk, said slider having a surface forming a plowing edge;
actuator means for moving the slider to plow debris from the data storing surface when said disk is rotated in the second direction;
a frame for supporting the disk rotating means and actuator means;
a cover sealingly coupled to the frame for preventing harmful particle contamination from entering the data storage device;
means for monitoring the error rates of the disk drive; and
means for initiating the cleaning of the disk based on said error rates.

* * * * *